United States Patent
Duval et al.

(10) Patent No.: US 11,788,436 B2
(45) Date of Patent: Oct. 17, 2023

(54) EXHAUST CASING OF A TURBOMACHINE WITH IMPROVED AERODYNAMICS

(71) Applicant: SAFRAN AIRCRAFT ENGINES, Paris (FR)

(72) Inventors: Sylvain Yves Jean Duval, Moissy-Cramayel (FR); Arnaud Lasantha Genilier, Moissy-Cramayel (FR); Fabien Stephane Garnier, Moissy-Cramayel (FR); Ludovic Pintat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 231 days.

(21) Appl. No.: 16/849,802

(22) Filed: Apr. 15, 2020

(65) Prior Publication Data
US 2020/0332680 A1 Oct. 22, 2020

(30) Foreign Application Priority Data

Apr. 16, 2019 (FR) ........................................ 1904059

(51) Int. Cl.
*F01D 25/24* (2006.01)
*F02K 1/04* (2006.01)
(Continued)

(52) U.S. Cl.
CPC ............. *F01D 25/246* (2013.01); *F01D 9/04* (2013.01); *F01D 25/243* (2013.01); *F02C 7/20* (2013.01); *F02K 1/04* (2013.01)

(58) Field of Classification Search
CPC ...... F01D 25/243; F01D 25/246; F01D 25/26; F01D 25/265; F01D 9/04; F02K 1/04; F02C 7/20
See application file for complete search history.

(56) References Cited

U.S. PATENT DOCUMENTS

| 4,441,313 A * | 4/1984 | Joubert .................. B64D 27/26 248/556 |
| 2010/0111685 A1* | 5/2010 | Sjunnesson ............. F01D 9/042 415/200 |

(Continued)

FOREIGN PATENT DOCUMENTS

| FR | 2677953 A1 | 12/1992 |
| FR | 2975131 A1 | 11/2012 |

(Continued)

OTHER PUBLICATIONS

Preliminary Research Report received for French Application No. 1904059, dated Jan. 21, 2020, 5 pages (1 page of French Translation Cover Sheet and 4 pages of original document).

*Primary Examiner* — Brian P Wolcott
*Assistant Examiner* — Jesse M Prager
(74) *Attorney, Agent, or Firm* — WOMBLE BOND DICKINSON (US) LLP

(57) ABSTRACT

A turbomachine exhaust casing extending about an axis including a hub extending about the axis; an external ferrule; arms which extend between the hub and the external ferrule, attachment yokes radially projecting toward the outside of the external ferrule; pockets hollowed into the external ferrule and wherein the yokes are arranged, the pockets extending in a hollow radially projecting toward the inside of the external ferrule; a ring portion which extends radially under the pockets and forms a duct wall by delimiting with the hub a portion of a gas flow duct.

9 Claims, 4 Drawing Sheets

(51) Int. Cl.
    *F01D 9/04*       (2006.01)
    *F02C 7/20*       (2006.01)

(56) References Cited

U.S. PATENT DOCUMENTS

| | | | |
|---|---|---|---|
| 2012/0093642 A1 | 4/2012 | Nilsson et al. | |
| 2015/0047370 A1* | 2/2015 | Beaujard | B64D 27/26 |
| | | | 403/80 |
| 2016/0003099 A1* | 1/2016 | Amnell | F01D 25/162 |
| | | | 415/213.1 |

FOREIGN PATENT DOCUMENTS

| | | | | |
|---|---|---|---|---|
| FR | 3051831 A1 | 12/2017 | | |
| GB | 1506952 A * | 4/1978 | | F01D 25/162 |

\* cited by examiner

EXHAUST CASING OF A TURBOMACHINE WITH IMPROVED AERODYNAMICS

BACKGROUND OF THE INVENTION

Field of the Invention

The invention relates to a turbomachine casing, particularly a turbomachine exhaust casing.

Description of Related Art

The exhaust casing is a structural part of a turbomachine usually disposed at the outlet of a turbine, upstream of the exhaust nozzle with respect to the direction of flow of the gases in the turbomachine.

As illustrated in FIG. 1, a turbomachine conventionally comprises from upstream to downstream, in the direction of flow of the gases (illustrated by the arrow G in FIG. 1), at least one compressor (not shown), a combustion chamber (not shown) and at least one turbine 12. Downstream of the turbine 12 is disposed the exhaust casing 10 which comprises an internal hub 14 and an external annular ferrule 16 which is attached to the hub 14 via structural arms 20 and which is disposed about an axis A of revolution which is the longitudinal axis of the turbomachine.

The ferrule 16 and the hub 14 together define a portion of an annular duct 18 for the flow of the combustion gases leaving the turbine 12.

The ferrule 16 and the hub 14 are rigidly linked to one another by the arms 20, which are structural, and mainly radial with respect to the axis A. The arms 20 can be inclined with respect to radial planes passing through the axis A.

The casing 10 includes flanges 22a-22d for coupling with the turbine upstream and the exhaust nozzle downstream. These attachment flanges are located at the longitudinal ends upstream and downstream of the casing 10. In the example shown in FIG. 1, the ferrule 16 comprises an annular flange 22a, 22b at each of its upstream and downstream longitudinal ends. The upstream flange 22a is attached to a downstream end of a casing of the turbine 12 and the downstream flange 22b is attached to an upstream end of an exhaust nozzle 24.

As can be seen in FIG. 2 and FIG. 3 (on the left) in order to attach the exhaust casing 10 to a support of the turbomachine, such as a pylon, it is known to make provision for named attachment points, yokes 5, radially projecting toward the outside of the external ferrule 16, the lugs of which extend radially and which have bores for receiving a shaft (not shown) used for the attachment of rods (not shown) on the pylon.

In a known manner, these yokes undergo heavy loads which makes it necessary to reinforce them. For reasons of mechanical withstand, the center of the yokes must be positioned radially at the level of the external ferrule 16. As a consequence, provision is made for pockets 6. However, these pockets extend in a hollow radially projecting toward the inside of the duct 18. Thus, the pockets impede the aerodynamics of the duct 18 with the consequence of losses of aerodynamic load and therefore losses regarding the performance of the turbomachine.

BRIEF SUMMARY OF THE INVENTION

The invention proposes to palliate at least one of these drawbacks.

For this purpose, the invention proposes, according to a first aspect, a turbomachine exhaust casing extending about an axis and comprising a hub extending about the axis; an external ferrule; arms which extend between the hub and the external ferrule; attachment yokes radially projecting toward the outside of the external ferrule; pockets hollowed into the external ferrule and wherein the yokes are arranged, the pockets extending in a hollow radially projecting toward the inside of the external ferrule; a ring portion which extends radially under the pockets and forms a duct wall by delimiting with the hub a portion of a gas flow duct.

The invention, according to the first aspect, is advantageously completed by the following features, taken alone or in any one of their technically possible combinations:

- the ring portion has a first radius with respect to the axis;
- the ring portion comprises a plate provided with openings each surrounding one arm;
- the ring portion comprises a first and a second plate, the first and second plates together delimiting openings each intended to surround one arm.
- the plates are attached together, by means of clips, rivets or by swaging.
- the first plate is disposed upstream of the second plate.

The invention proposes, according to a second aspect, a turbomachine assembly comprising, from upstream to downstream, in the direction of flow of the gas stream in the turbomachine;

- a turbine comprising a turbine casing comprising a downstream attachment flange;
- an exhaust casing, according to the first aspect of the invention, said exhaust casing comprising an upstream attachment flange, the turbine casing being attached to the exhaust casing between the downstream flange of the turbine casing and the upstream flange of the exhaust casing;
- a nozzle comprising an upstream flange, the nozzle being attached to the exhaust casing between the upstream flange of the nozzle and the downstream flange of the exhaust casing.

The invention according to the second aspect is advantageously completed by the following features, taken alone or in any one of their technically possible combinations:

- the ring portion is attached, upstream by clamping between the upstream flange of the exhaust casing and the downstream flange of the turbine casing, or by riveting to the external ferrule of the exhaust casing.
- the ring portion is attached, downstream, by clamping between the downstream flange of the exhaust casing and the upstream flange of the nozzle, or by riveting to the external ferrule of the exhaust casing.

Finally, the invention proposes according to a third aspect a turbomachine comprising an exhaust casing according to the first aspect of the invention.

The advantages of the invention are several.

The pockets no longer extend in projection into the flow duct of the gas stream. The performance of the turbomachine is therefore improved.

Furthermore, as the pockets are no longer in contact with the gas stream, the temperature of them is reduced, which leads to better mechanical strength. It is also possible to make provision for pockets, the thickness of which is reduced with respect to the usual configuration.

Thus, the casing can be reinforced at the level of the yokes via the pockets without it affecting the aerodynamics of the duct.

BRIEF DESCRIPTION OF THE DRAWINGS

Other features, aims and advantages of the invention will become apparent from the following description, which is

On all the figures similar elements bear identical reference numbers.

DETAILED DESCRIPTION OF THE INVENTION

Figure 1:
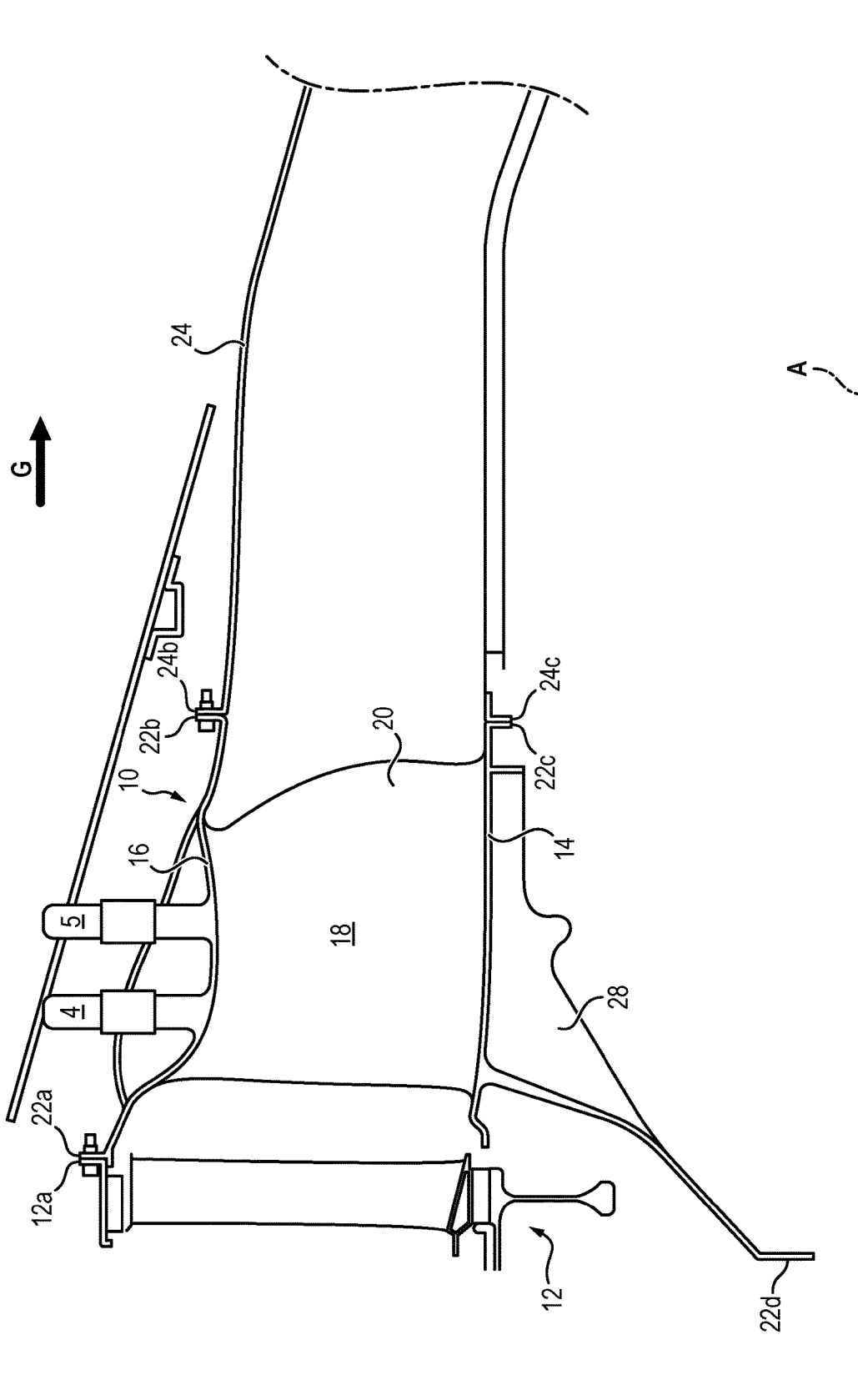
FIG. 1 illustrates a turbomachine structure.
Figure 2:
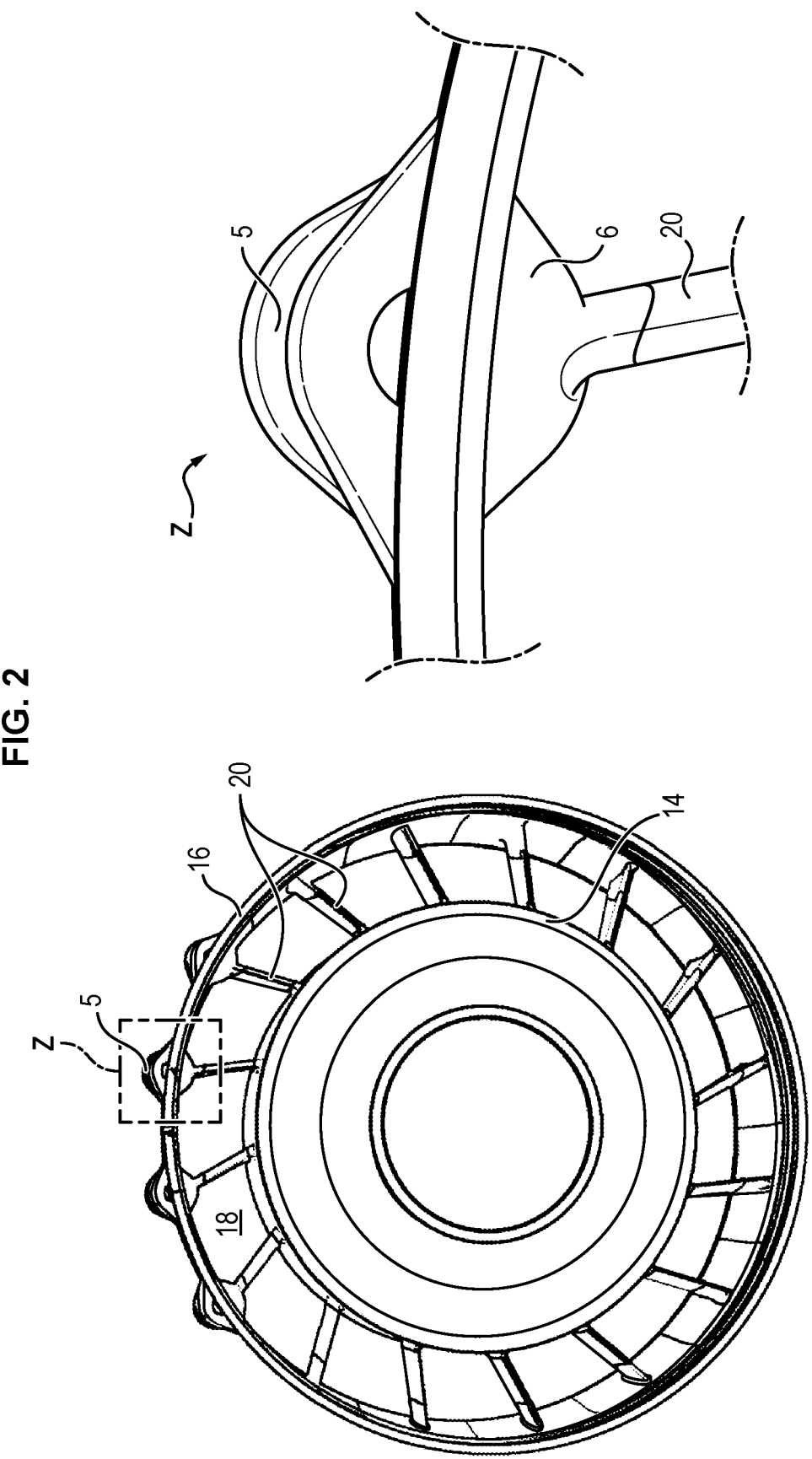
FIG. 2 illustrates un exhaust casing and its attachment of known type.
Figure 3:
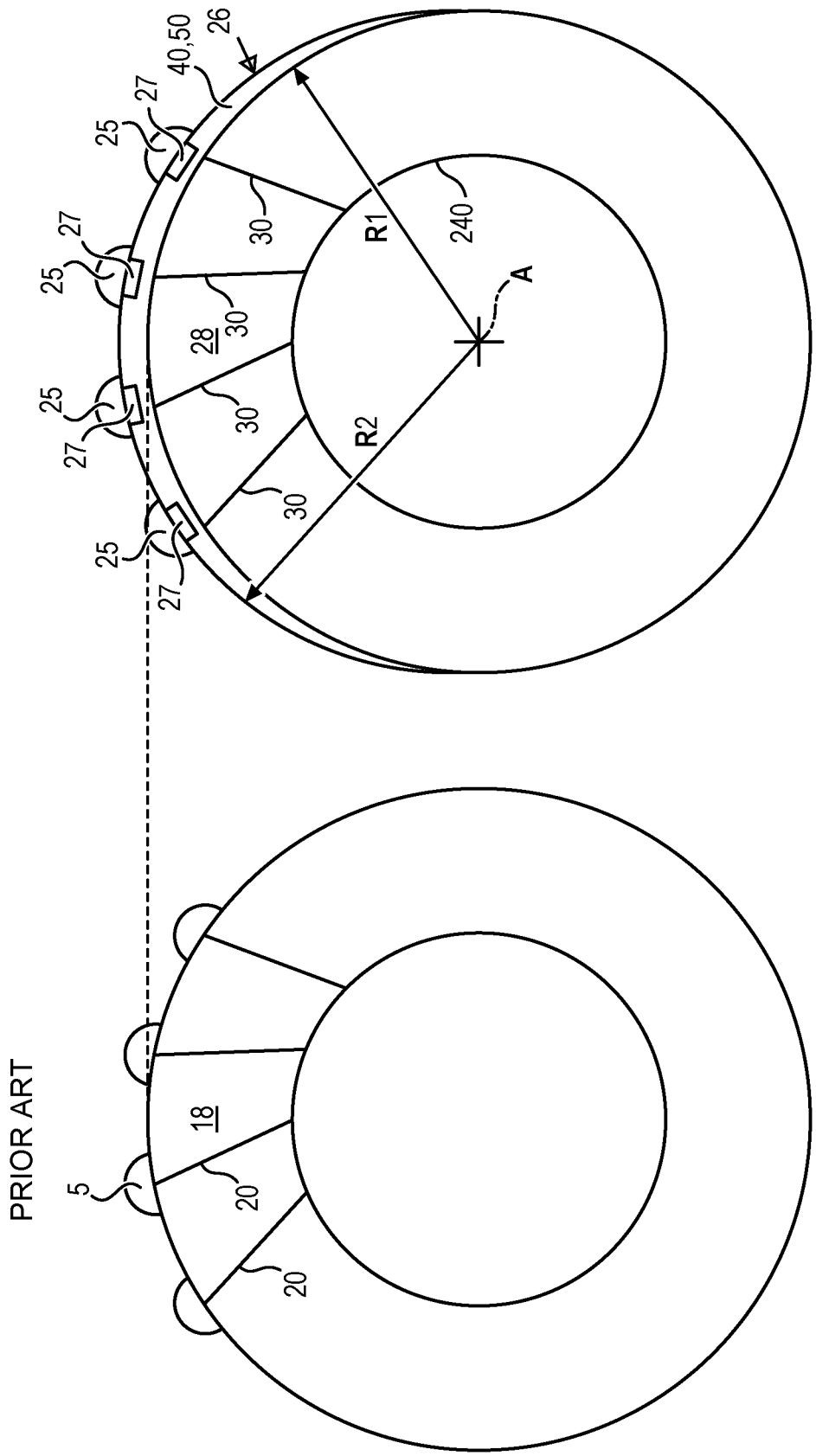
FIG. 3, on the left illustrates an exhaust casing of known type and on the right an exhaust casing according to an embodiment of the invention.

FIG. 3, on the right, illustrates a schematic front view of a turbomachine exhaust casing according to an embodiment.

Such an exhaust casing comprises a hub 240 extending about a longitudinal center axis of the turbomachine and a structural external ferrule 26. Arms 20, which are structural, extend from the hub 240 toward the external ferrule 26. Projecting yokes are disposed on the structural external ferrule and allow the attachment of the casing, particularly to a pylon. The yokes are disposed, in particular radially above structural arms 20. In FIG. 3, on the right, these yokes are four in number without this being limiting. It will specifically be understood that the number of yokes depends on the method of attachment of the exhaust casing 10 to the pylon.

As already discussed, pockets 27 are disposed under the structural external ferrule 26 and below each yoke 25. More precisely, the pockets 27 are disposed on the internal surface of the external ferrule 26 below each yoke 25.

In order to remove the drawbacks due to the pockets, presented above, a non-structural ring portion 40, 50 is disposed below the pockets 27 and defines with the hub 240 a flow duct 28 of the gas stream in the turbomachine.

The stream flow duct is therefore no longer formed by the hub and the external ferrule but by this ring portion and the internal hub as regards the area at the level of the yokes and the pockets.

As a consequence, the external ferrule no longer has a constant radius over its entire circumference, but has an area located radially above the ring portion 40, 50, at the level of the yokes, which has a radius R2 greater than the rest of the ferrule of radius R1. It is precisely below this portion that the ring portion 40, 50 is disposed. The duct 28 meanwhile has a constant radius R1 over its entire circumference.

To a certain extent, the center of the yokes has been off-centered with respect to the configuration of the prior art, and the stream flow duct (circular) has been reshaped by means of the ring portion 40, 50. This is visible on the left and right parts of FIG. 3 disposed side by side. Hence, the pockets are radially disposed above the stream circulation duct and are no longer disposed in the duct.

The ring portion 40, 50 therefore makes it possible to reshape the duct.

Furthermore, the ring portion 40, 50 prevents the gases circulating in the duct to come and flow onto the hollows formed by the pockets.

As in the prior art, the pockets are disposed about structural arms radially disposed below yokes and it is therefore necessary to make provision for an adapted geometry for the non-structural ring portion 40, 50. In particular, the assembly of the ring portion 40, 50 can be carried out in several ways.

Figure 4:
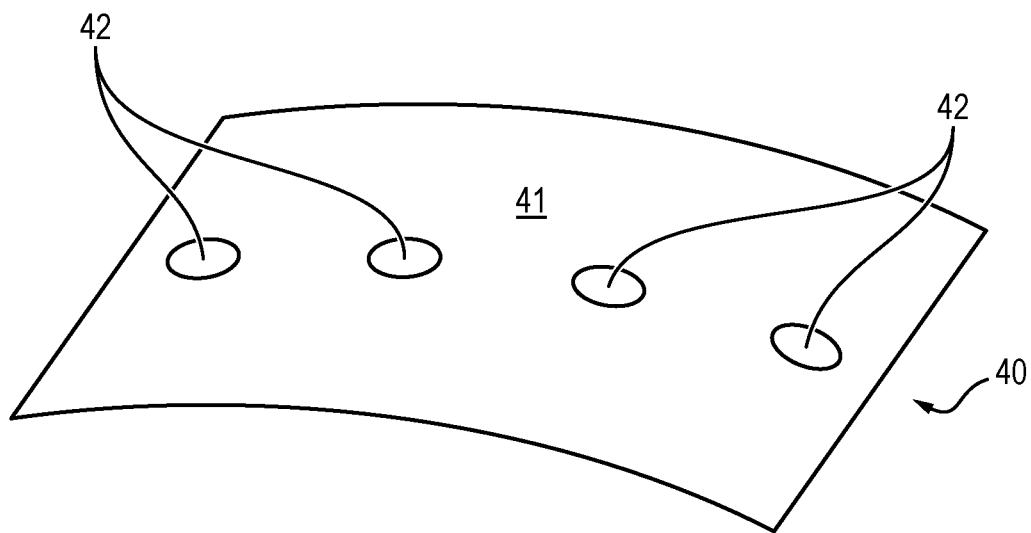
FIG. 4 illustrates a ring portion according to a first variant of incorporation into the exhaust casing of the invention.

FIG. 4 illustrates a ring portion 40 used to reshape the duct according to a first variant. According to this first variant, the ring portion is composed of a plate 41 wherein openings 42 are formed to allow the structural arms to pass through.

Figure 5:
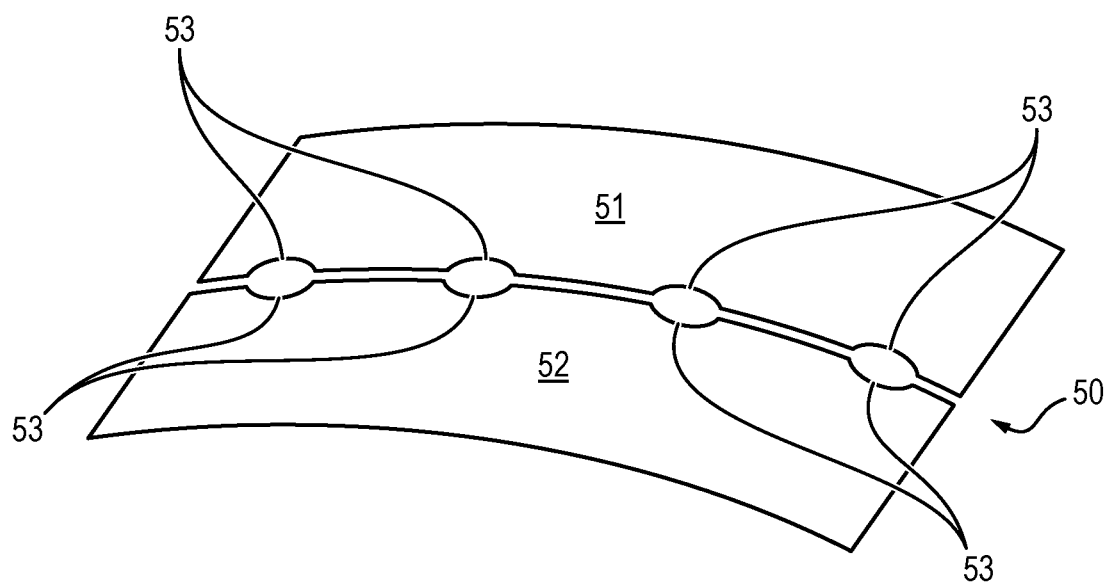
FIG. 5 illustrates a ring portion according to a second variant of incorporation into the exhaust casing of the invention.

FIG. 5 illustrates a ring portion 50 used to reshape the duct according to a second variant. According to this variant, the ring portion is composed of two plates 51, 52: a first plate and a second plate, the first plate comprising first portions of openings 53 which cooperate with second portions of openings of the second plate such as to form openings for receiving the arms that surround the arms. Still according to this variant, the plates 51, 52 are mutually attached by several types of attachment: clips, clamps formed by swaging, riveting etc.

The openings 42 or 53 are of an appropriate geometry for the geometry of the structural arms.

The ring portion 40, 50 makes it possible to ensure that the gas stream flow duct is annular. To avoid leaks of the gas stream, the ring portion can be attached in an airtight manner on the one hand to the turbine 12 and on the other hand to the nozzle 24.

Upstream of the exhaust casing 10, the turbine comprises a turbine casing comprising a downstream attachment flange 12a and the exhaust casing comprises an upstream attachment flange 22a. In this case, the turbine casing is attached to the exhaust casing by way of a coupling between the downstream flange of the turbine casing and the upstream flange of the exhaust casing.

Upstream, provision can be made for attaching the ring portion 40, 50 to the turbine by way of the flanges 12a, 22a, preferably by clamping between the upstream annular flange of the exhaust casing and the downstream flange of the turbine casing. Alternatively, the ring portion is attached to the external ferrule 26 by riveting.

Downstream of the exhaust casing, the nozzle comprises an upstream flange 24b and the exhaust casing comprises a downstream flange 22b, in this case, the nozzle 24 is attached to the exhaust casing 10 by way of a coupling between the upstream flange of the nozzle and the downstream flange of the exhaust casing.

Preferably, the ring portion is attached downstream by clamping between the downstream annular flange of the exhaust casing and the upstream flange of the nozzle. Alternatively, the ring portion is attached to the external ferrule 26 by riveting.

It is of course possible to make provision for an attachment upstream of the ring portion by clamping and downstream by riveting and vice versa.

Whatever the method of attachment, the only restriction is that the downstream and upstream coupling of the ring portion with on the one hand the turbine 12 and on the other hand the nozzle be airtight.

The invention claimed is:

1. A turbomachine exhaust casing extending about an axis and comprising
   a hub extending about the axis;
   an external ferrule having an internal surface and an external surface, the external ferrule including a first angular section and a second angular section;
   arms which extend between the hub and the external ferrule, attachment yokes radially projecting toward the outside of the external ferrule; the attachment yokes being disposed along the second angular section of the external ferrule;

pockets disposed on the internal surface of the external ferrule and below each attachment yoke, each pocket extending from the internal surface of the external ferrule in a radial direction toward the inside of the external ferrule; each pocket extending from each corresponding arm and surrounds the corresponding arm radially disposed below each yoke, each said arm projecting from a corresponding pocket toward the hub, each said pocket being configured to reinforce the yoke;

a gas flow duct extending about the axis, the gas flow duct disposed annularly between the hub and the external ferrule, and the gas flow duct including a constant first radius;

a ring portion which extends radially under the pockets and forms a duct wall by delimiting with the hub a first portion of the gas flow duct, the pockets being radially disposed above the gas flow duct, the gas flow duct having a second portion defined by the first angular section of the external ferrule and the hub, the first portion and the second portion of the gas flow duct constituting a complete section of the gas flow duct, and the second angular section of the external ferrule including a second radius greater than the first radius.

2. The exhaust casing as claimed in claim 1, wherein the ring portion comprises a plate provided with openings each surrounding each said arm.

3. The exhaust casing as claimed in claim 1, wherein the ring portion comprises a first and a second plate, the first and second plates together delimiting openings each intended to surround one of said arms.

4. The exhaust casing as claimed in claim 3, wherein the plates are attached together, by means of clips, rivets or by swaging.

5. The exhaust casing as claimed in claim 4, wherein the first plate is disposed upstream of the second plate.

6. A turbomachine assembly comprising, from upstream to downstream, in the direction of flow of the gas stream in the turbomachine;

a turbine comprising a turbine casing comprising a downstream attachment flange;

an exhaust casing, as claimed in claim 1, the exhaust casing comprising an upstream attachment flange, the turbine casing being attached to the exhaust casing between the downstream flange of the turbine casing and the upstream flange of the exhaust casing;

a nozzle comprising an upstream flange, the nozzle being attached to the exhaust casing between the upstream flange of the nozzle and a downstream flange of the exhaust casing.

7. The assembly as claimed in claim 6, wherein the ring portion is attached, upstream by clamping between the upstream flange of the exhaust casing and the downstream flange of the turbine casing, or by riveting to the external ferrule of the exhaust casing.

8. The assembly as claimed in claim 6, wherein the ring portion is attached, downstream, by clamping between the downstream flange of the exhaust casing and the upstream flange of the nozzle, or by riveting to the external ferrule of the exhaust casing.

9. A turbomachine comprising an exhaust casing as claimed in claim 1.

* * * * *